United States Patent [19]

Kalt

[11] Patent Number: 5,638,084

[45] Date of Patent: Jun. 10, 1997

[54] LIGHTING-INDEPENDENT COLOR VIDEO DISPLAY

[75] Inventor: Charles G. Kalt, Williamstown, Mass.

[73] Assignee: Dielectric Systems International, Inc., North Adams, Mass.

[21] Appl. No.: 681,606

[22] Filed: Jul. 29, 1996

Related U.S. Application Data

[63] Continuation of Ser. No. 228,111, Apr. 15, 1994, abandoned, which is a continuation-in-part of Ser. No. 66,949, May 24, 1993, Pat. No. 5,519,565, which is a continuation-in-part of Ser. No. 887,714, May 22, 1992, Pat. No. 5,231,559.

[51] Int. Cl.[6] ........................................ G09G 3/04
[52] U.S. Cl. ........................ 345/31; 345/85; 359/230; 361/280
[58] Field of Search ........................ 345/84, 85, 108, 345/206, 88, 31, 48; 359/230, 223, 231, 291; 313/459; 361/280, 281

[56] References Cited

U.S. PATENT DOCUMENTS

| | | | |
|---|---|---|---|
| 4,509,854 | 4/1985 | Pearson | 355/38 |
| 4,794,370 | 12/1988 | Simpson et al. | 345/85 |
| 5,147,743 | 9/1992 | Grossa | 430/7 |
| 5,231,559 | 7/1993 | Kalt et al. | 361/301 |
| 5,233,459 | 8/1993 | Bozler et al. | 359/230 |
| 5,250,931 | 10/1993 | Misawa et al. | 345/98 |
| 5,340,619 | 8/1994 | Chen et al. | 427/498 |
| 5,401,616 | 3/1995 | Isomi et al. | 430/258 |

FOREIGN PATENT DOCUMENTS 0455233   11/1991   European Pat. Off. ............... 345/206

OTHER PUBLICATIONS

Gary Stix, Staff Writer <<Micron Machinations>> Nov. 1992 pp. 107–117 Scientific American.

*Primary Examiner*—Richard Hjerpe
*Assistant Examiner*—Lun-Yi Lao
*Attorney, Agent, or Firm*—Handal & Morofsky

[57] ABSTRACT

An electrostatically actuated color video display is disclosed which can be illuminated by backlighting transmitted through the display and by reflected ambient light to have good visibility in both bright daylight and in subdued or dim light. To display full-color dynamically changing images from an electronic video signal the functions of creating the image and of generating color light rays for use in the image are separated. A preferred embodiment employs a pixellated color screen having rectangular cells of alternate red, green, blue and a somewhat opaque white color and a shuttering mask comprising an array of selectively actuatable light-modulating capacitors with black movable electrodes that when retracted are in registration with and present an open light path to individual color screen cells and when extended present a continuous black screen appearance.

18 Claims, 3 Drawing Sheets

LIGHTING-INDEPENDENT COLOR VIDEO DISPLAY

CROSS-REFERENCE TO RELATED APPLICATIONS

This application is a Continuation of application Ser. No. 08/228,111, filed 15 April 1994, now abandoned, which was a continuation-in-part of U.S. patent application Ser. No. 08/066,949 of Kalt and Slater, filed May 24, 1993 now U.S. Pat. No. 5,519,565 which, in turn, is a continuation-in-part of U.S. patent application Ser. No. 07/887,714 of Kalt and Slater, filed May 22, 1992, now U.S. Pat. No. 5,231,559 dated Jul. 27, 1993. The disclosures of our applications Ser. Nos. 08/066,949 and 07/887,714 are hereby incorporated herein by reference thereto.

TECHNICAL FIELD

The present invention relates to electronically driven, colored video displays that can translate electrical or electronic signals into video information. Such displays, or display screens, typically comprise a pixellated screen formed by individual, light-modulating picture elements that can be controlled to provide text or graphic images. More particularly, the invention relates to displays which employ capacitive pixels having light-modulating, movable electrodes that can adopt a number of positions, at least one of which is a position extending across the path of a light beam travelling through the pixel. By selective actuation to change the appearance individual pixels, arrays of such pixels can be composed into meaningful images.

BACKGROUND OF THE INVENTION

Video displays can be classified as either reflective or transmissive. Both types of displays are quite sensitive to lighting conditions. Liquid crystal displays used in portable computers and other electronic devices, such as paging devices, telephones, telefacsimile machines, watches, instruments and the like, are examples of low-power, reflective video displays which can be seen clearly in bright lighting conditions and depend upon reflection of ambient light, off a high contrast display surface, for their appearance. Reflective displays become difficult or impossible to view clearly in dim or low lighting conditions, for example, at night.

Transmissive displays include a light-emitting source, for example phosphors or diodes, which source can be built into the display screen. Common examples are conventional television screens and computer monitors as well as, for example, portable computer displays that employ light-emitting diodes. Another important application for light-emitting, transmissive displays is in instrumentation for aircraft, automobiles and other vehicles. Light-emitting transmissive displays can be clearly seen in low lighting conditions but lose contrast and visibility in bright light, for example, when taken outdoors. Safety problems may occur when operators view vehicle instruments or other travel guidance displays, during dramatic changes in ambient light. Thus there is a need, for example, for aircraft flight information displays which remain clearly visible as an aircraft emerges from heavy cloud into the brilliant sunlight of the stratosphere. Another desirable lighting-independent display is a computer screen, especially a portable computer screen that can be viewed outdoors.

Over a period spanning several decades, I have developed electronically driven video displays that employ, as pixels, light-modulating capacitors with movable electrodes. In a light modulating capacitor, a movable electrode is coiled, or otherwise prestressed, into a compacted, retracted position from which it can be advanced across a dielectric member by application of a drive voltage. The drive voltage is controlled by a fixed electrode on the other side of the dielectric member, the movable and fixed electrodes and the dielectric member constituting a variable capacitor.

By appropriate choice of the optical character of the movable electrode, a light beam striking the capacitor can be modulated as desired, for example by varying the hue, lightness and saturation characteristics of the light. Using tapered electrode patterns or shapes, the extent of excursion of the electrode can be made voltage dependent and thus controlled. Arrays of such pixels can be matrixed to provide large-screen displays such as highway signs and scoreboards. As disclosed in my above-cited pending applications, electrostatically driven pixels can be miniaturized and incorporated not only in conventional video-displaying equipment such as computer and television equipment but also in novel, compact low-power flat-screen displays that can, for example be small enough to be handheld and carried in a pocket.

My U.S. Pat. No. 3,989,357 shows some early examples of such light-modulating capacitors, employing a rolling electrode which is coiled in its retracted position and which is deployed in a variety of embodiments, including matrixed assemblies of multiple such elements. Several reflective display embodiments are shown, which rely upon ambient light to illuminate the display. In addition, the embodiment of FIG. 5 shows a light-transmissive pixel, in which light passes through a somewhat translucent fixed electrode of such a capacitive element. This FIG. 5 proposal depended upon a thin layer of aluminum to be both translucent and adequately conductive to act as a fixed control electrode for a movable light-modulating electrode. Since aluminum is only mildly transparent to light when thick enough to be conductive, the use of an aluminum film electrode has limited application and is not satisfactory for pictorial quality video displays.

My patent No. 4,266,339 relates to a method of manufacturing rolling-electrode-type, light-modulating capacitors, which method employs heating and cooling of a metalized tented plastic sheet to provide prestressed, coiled electrode elements or spirals.

My patent No. 5,231,559 discloses novel video displays; and their manufacture, including video displays employing light-modulating capacitors with transparent electrodes utilizing a light path to a viewer which traverses at least one transparent electrode on both an incident and a reflected course. High transmissivity electrode material, for example indium tin oxide, is used to avoid undue attenuation of the light beam as a result of its dual passage through the transparent fixed electrode. These capacitors can be assembled into more or less complex pixels, some employing two or more such movable light-modulating electrodes along a single light path. Multiple electrodes can visit the same area across a light path and can be assembled in pairs, or other groupings, on either side of a transparent substrate. Employing such matrixes of flexibly configurable pixels, full color and monochrome reflective screens can be created which have excellent definition, excellent visibility, are economical and easy to manufacture from low cost materials, yet consume very little power.

Some further developments of these subjects are disclosed and claimed in my pending application Ser. No. 08/066,949 including digitally responsive display pixels, manufacturing methods, miniaturized electrode configurations and some non-video applications of the inventive electrostatically actuated movable electrode technology. Further patents of mine describe and claim reflective display devices which employ electrostatically driven, active movable elements that have become known as "flapper" devices because they move from one side to another of a reflective channel to switch between different display states having selected, different visual characteristics. Some such patents are U.S. Pat. Nos. 4,488,784, 4,094,590, 4,336,536 and 4,468,663. These disclosures are not applicable to transmissive display pixels.

SUMMARY OF THE INVENTION

The invention, as claimed, is intended to provide a remedy. It solves the problem of how to provide a color video screen that can present a clearly visible display independently of ambient lighting conditions, that is to say a display that can be seen clearly in both subdued, or dim, light and strong daylight. A further problem solved by the invention is to provide such a display which is operative in different lighting modes, yet needs no activation to change between modes, nor needs adjustment for changes in lighting.

To solve these and other problems, the invention provides a flat-screen video display having a layered matrix structure and employing light-modulating capacitor pixels in a simple, composition screen comprised of an array of pixel-size shutters constituted by the light-modulating capacitors, operating in conjunction with a novel color screen which is preferably also pixelated to provide differently colored cells corresponding with the pixel-size shutters in the composition screen. In addition to a color screen layer, the layers can comprise an array of light-modulating capacitors formed from a movable electrode layer, a dielectric layer and a control electrode layer.

The movable electrode mask layer has a composite array of movable electrodes disposed toward a viewer, the movable electrodes having an open, retracted position providing a clear light path past the movable electrode to offer maximum light transmissivity through the mask layer. In a fully extended, unfurled position of each movable electrode, the light path is fully occluded by each movable electrode and a continuous composite monochrome, or achromatic display can be presented. By controlling the position of the electrodes between these extreme positions, pixel intensity can be infinitely varied to provide full dynamic control of visual characteristics such as tint, shade, gray scale and the like.

The dielectric layer has a transparent sheet-like dielectric member in capacitive contact with the movable electrodes in the extended position of the movable electrodes.

The control electrode layer has an array of translucent control electrodes contacting and in electrostatic engagement with a second surface of the dielectric member to control the movable electrodes. These layers are aligned, or registered, so that the movable electrodes, the dielectric member and the control electrodes provide the array of light-modulating capacitors.

The color screen layer has a translucent color screen disposed adjacent to the array of light-modulating capacitors and on an opposite side thereof with respect to the viewer.

The inventive video display also comprises drive circuitry to apply drive voltages selectively between the fixed electrodes and the movable electrodes to effect movement of selected movable electrodes.

In operation of the inventive video display, movement of an individual movable electrode into a retracted, open position displays a segment of such colored screens to a viewer and multiple movable electrodes can be actuated to display a composed image area of the colored screen segments to the viewer.

Light from a source of backlighting passes through the color screen where it is pixellated preferably by dividing and modulating the source light beam to provide discrete small rays in groups of primary colors, obtained by filtering, and white. The composite, pixellated multicolor light beam transmitted by the color screen strikes the array of movable electrodes which, acting as miniature shutters, mask out undesired light areas of the color screen to compose the desired image. Front, or ambient light, e.g. daylight, proceeds on a reflective path, through open areas between shutters constituted by closed light-modulating capacitors having extended movable electrodes, on to the color screen where a suitably modulated beam is reflected back through the open light-modulating capacitors to the viewer. The color screen is designed to have a substantial or high reflectance, of at least 30 percent and preferably at least 60 percent, referring to the intensity of the incident beam for a reflected wavelength or wavelengths, and to present a similar appearance by both transmitted and reflected light.

The invention thus provides a simple, economical, full-color video display which has excellent visibility by reflected light.

By selectively masking, or unmasking, adjacent pixel-sized color cells desired colored appearances can be obtained at the pixel level. For example, groups of four adjacent color screen cells, colored with three primaries (preferably red, green and blue) and white, can cooperate with a registered set of four shutters constituted by four light-modulating capacitors presenting a black surface to a viewer, when closed, can comprise a full-color grouped pixel presenting a full range of visual characteristics analogous to a group of red green and blue phosphors in conventional electron beam displays.

The invention can be more broadly stated to provide a multicolor video display for displaying electronically generated dynamically changing multicolor images to a viewer at a designated viewing distance, said video display comprising:

i) a passive color screen segmented into a mosaic of colored cells arranged in similar groups of adjacent colored cells said adjacent cells of a group having different visual appearances, said different visual appearances being optically mixable at said designated viewing distance;

ii) a dynamic image-composition mask positioned between said passive color screen and said viewer and having image composition means for selectively filtering and masking modulated light received from said color screen to create a desired, colored video image.

BRIEF DESCRIPTION OF THE DRAWINGS

One way of carrying out the invention is described in detail below with reference to the drawings which illustrate only one specific embodiment of the invention and in which.

BEST MODE FOR CARRYING OUT THE INVENTION

Figure 1:
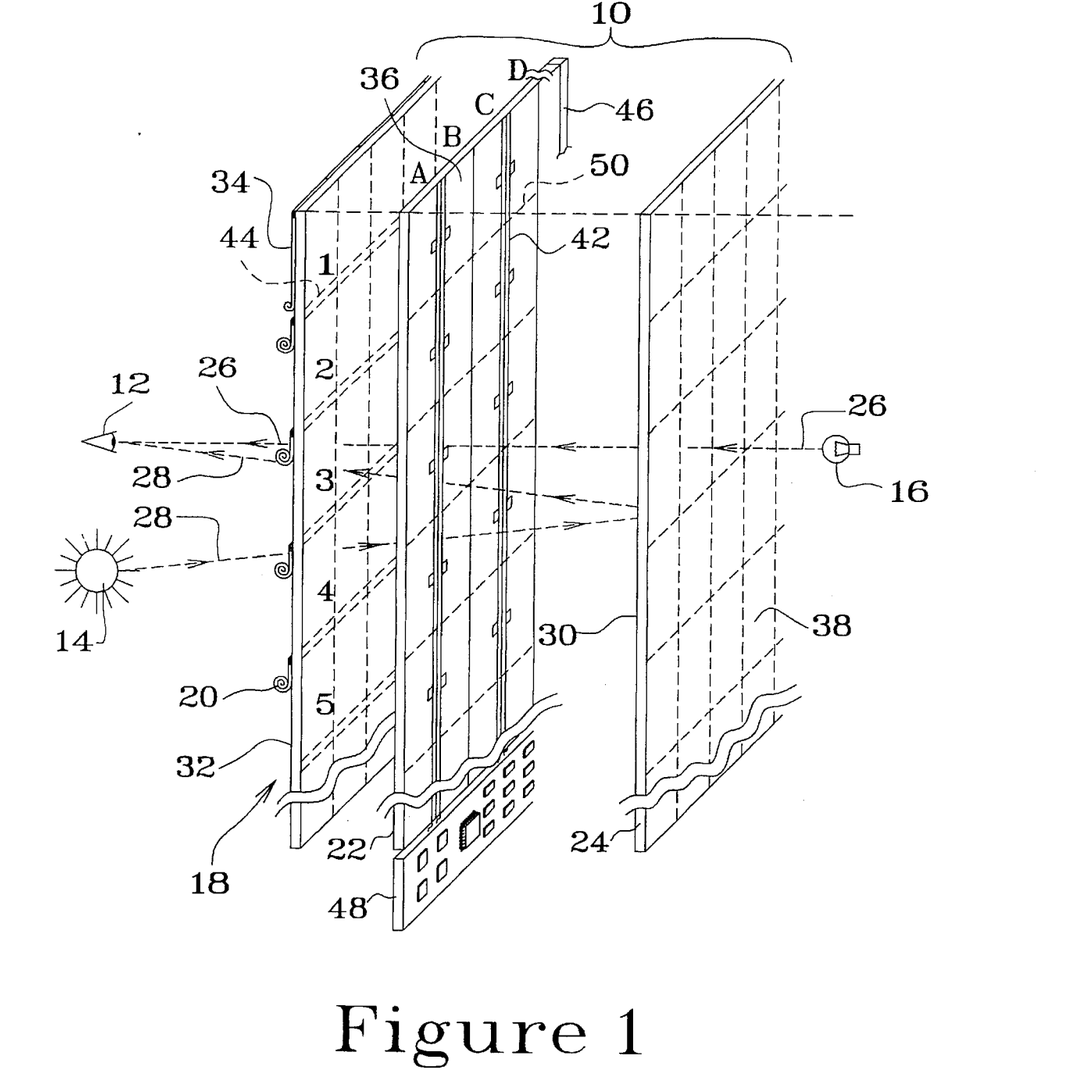
FIG. 1 is a schematic perspective view of one inventive embodiment of a layered structure, flat video display (from which a transparent cover has been omitted) exploded in a direction of view to show the relationship between layers and details of individual layers of the structure.

Referring to FIG. 1, a video display 10 is shown as observed by a viewer 12, in the presence of front lighting schematically shown at 14, which front lighting may comprise daylight or sunlight or any relatively bright artificial lighting. The embodiment shown includes built-in back lighting 16, so as to be substantially illuminant or lighting independent, as will be explained hereinafter. Directions used in this description are from the perspective of the viewer 12 with the video display 10 in an upright position in FIG. 1.

The principal layers of interest in the structure of the video display 10 comprise a matrix layer 18 of movable electrodes 20; a control electrode layer 22 of transparent fixed electrodes; and a color screen 24 which is both transparent and reflective and displays differently colored areas having comparable appearances in both transmissive and reflective modes. The term "transflective" may be used, for this screen, and may even be coined herein.

Matrix layer 18 of movable electrodes 20 will usually be protected by a transparent cover 52 (FIG. 3) of high light transmissivity. The volume in which electrodes 18 move can be evacuated, if desired, but this is not believed necessary in most embodiments.

Light may reach viewer 12 along either a transmissive or a reflective path. Light traveling on a transmissive light path 26, proceeds directly from back lighting 16 through color screen 24, through control electrode layer 22, and through matrix layer 18 to viewer 12. Light traveling along a reflective path 28 proceeds from front lighting 14, as an incident ray, which is transmitted through matrix layer 18, and through control electrode layer 22 to a front surface 30 of color screen 24 where it is reflected (and possibly modulated, for example to color the light ray 28). The reflected ray 28 is transmitted back through control layer 22, and through matrix layer 18, to the viewer 12. Thus, in traveling on reflective path 28, light passes twice through each of the matrix layers and the fixed electrode layers. Accordingly, the light intensity at the viewer is diminished to a value which relates to the square of the transmissivities of any layer traversed twice, including both the matrix and fixed electrode layers and any transparent substrate or cover layers that may be present for structural purposes. Of these materials, the one with the lowest transmissivity will probably control the intensity of the image perceived by the viewer by offering the greatest attenuation of a reflected beam, and consequent reduction of intensity of the image reaching viewer 12. This lowest transmissivity material is likely to be the control electrode layer 22 which should accordingly employ materials that are as transparent as possible, consistent with the required electrical characteristics of control electrode layer 22.

Movable electrodes 20, in matrix layer 18 are arranged so that when all electrodes are extended they form a flat open screen, for which purpose they are preferably colored or coated with a black colorant or coating material, for example, black ink to provide a uniform black display screen. Matrix layer 18 also incorporates a sheet of a transparent dielectric 32 of any suitable material, for example polypropylene. Movable electrodes 20 have a conductive, metalized electrode layer which is brought into contact with a front surface of transparent dielectric 32 when the movable electrode is in an extended position. This metalized layer serves as a variable electrode having a variable contact area with dielectric 32. Preferably movable electrodes 20 are, as disclosed in my above cited pending patent applications, plastic elements that are prestressed into coils or spirals. A metalized polyester film, for example MYLAR (trademark Dupont) film, is a preferred material and a layer of electrodes 20 can conveniently be manufactured out of a single, possibly continuous, sheet of such metalized film material by laser etching, scoring, or otherwise abrading outlines of electrode patterns partially through the film, then curing the film to cause individual electrodes 20 to form by curling, as is described more fully in parent application 08/066,949.

Such sheets are available as thin as 1 micron and even 0.5 micron. For larger display embodiments, 2.5 micron thick films are preferred. Drive circuitry (not shown) connects movable electrodes 20 in rows numbered 1, 2, 3, 4, 5 ... etc. for selective application of control voltages thereto.

The shape and size of movable electrodes 20 determines the pixel size of display 10. The optical character of a pixel can be influenced by any of the materials and components on light path 26 or 28, but its aperture is effectively controlled by the opening provided by retraction of a movable electrode 20. The pixels, and movable electrodes 20 defining them, are accordingly, suitably proportioned in relation to the overall size of the display and the intended position of the viewer 12 to provide well-defined images in which individual pixels are not visible. These factors are taken into account by considering the resolution of the display. A rather low display resolution is obtained from a display having approximately 200 pixels along its longer side and a proportionately smaller number on its shorter side. However, this resolution might be quite adequate for some applications such as instrumentation or for cruder displays such as road signs. A much more desirable resolution is of the order of 500 to 1,000 pixels along the longer side with applications up to 2,000 or more pixels being readily envisaged for sophisticated users. A pixel density of about 1,000 along the longer side of the display, with a proportionate number on the shorter side will give a resolution comparable with what is currently described as "super VGA" in present-day computer equipment, a resolution superior to current television displays.

The movable electrodes 20 can have sizes in a range of from about 0.01 inches (about 0.25 mm) up to about 1 inch (about 25 mm), again depending upon the intended size of the display. Metalized polyester film is a suitable material for providing such electrodes in such a size range. Surprisingly, as disclosed in our copending application Ser. No. 08/066,949 miniaturized movable electrodes have unique properties, especially an unexpectedly quick mechanical cycle time, in response to modest voltage changes. Such miniaturized movable electrodes can constitute the active elements in micropixels as small as 0.004 in. (about 0.01 cm. or 100 micron) employing ultra-thin metallized polyester film materials, which are available as thin as 1 or even 0.5 micron.

Such micropixels would provide excellent definition in displays as small as 2 inches offering a new range of possible applications for handheld and pocket displays and for full-image instrumentation displays or even for novel field of view displays on cameras. The latter could release photographers, both still and video, from the constraints imposed by conventional needs to hold a viewfinder or eyepiece close to the eye in order to read or compose an image in the camera's field of view, by incorporating a small video window with a sharp reflective display on a suitable camera surface such as the back or top.

When a voltage is applied between any selected movable electrode 20 and its respective fixed electrode in control electrode layer 22, that movable electrode 20 is electrostatically attracted to its control electrode. Such an activated movable electrode 20 rapidly rolls across transparent dielectric 32, partially or completely occluding light on the light path extending therethrough and presenting an opaque, preferably pigmented, non-metalized outer surface 34 to viewer 12. Outer surface 34 is preferably black, for maximum contrast and grey scale range. However, greys or monochromes can be used with a preference for the outer surface 34 of each electrode 20 having a similar appearance to present a continuous tone display when all electrodes 20 are fully extended. Alternatively, for special effects, the surfaces 34 could be varied, for example, to display a commercial logo with the electrodes 20 fully extended. Such use of surfaces 34 for image display is preferably effected in a subtle manner, probably at low contrast so as minimally to affect the normal display of video images.

The extent of excursion of movable electrodes 20 can be controlled and rendered voltage-dependent in a number of ways, some of which are disclosed in the parent applications and one of which is to employ tapering either for the movable electrode 20 or for a respective control electrode in the direction of movement. Selective control of individual electrode excursion permits the intensity of light coming from the corresponding exposed pixel to be controlled, and provides continuously variable grey scale control of the displayed image. Control of tinting is attainable by appropriate control of relative exposures of primary color and white pixels while the degree to which each electrode is unfurled to expose a black reflective surface to the viewer controls shading. Alternative electrode excursion control can be provided electronically, for example by varying drive voltage pulse duration or frequency at constant voltage, and such electronic control can be used with non-tapered electrodes have a substantially uniform width across their direction of movement.

As described in my co-pending applications, movable electrodes 20 preferably adopt a simple geometrical shape which can be interfitted, one with another, to provide a continuous sheet or layer, and a continuous screen appearance. In a simple, economically manufactured, embodiment, the electrode shape is square or rectangular and, if desired, a thin grid-like mask can be provided to conceal boundary lines between electrodes. Another preferred shape is triangular, which can be arranged in diamond or hexagon grid patterns.

When a maximum or full drive-actuation voltage is applied to all the movable electrodes 20, then all become fully extended and the video display appearance is that of a flat black, screen. Operation of any particular group of electrodes presents an open light path to the interior of the display, from where desired and selected visual characteristics can be reflected or transmitted to the viewer 12. Metalization of a plastic movable electrode on its convexly furled surface 35 which contacts transparent dielectric 32 is preferably such as to render that surface substantially reflective so that, as a coiled retracted electrode is presented to a viewer, to whom it preferably subtends a small enough angle to be imperceptible, it takes on, by diffusion or reflection, the character of the light traveling on a light path through the respective pixel. This phenomenon helps conceal the presence of the movable electrodes 20 which should be hard or impossible to detect by the naked eye at the intended viewing distance.

Control electrode layer 22 comprises an array of fixed or stationary electrodes such as 36, each of which is configured, dimensioned and arranged to register with an individual movable electrode 20. Fixed electrodes 36 can be defined by etching insulative lines 50 between adjacent electrodes in a layer of transparent conductive ceramic electrode material. When an actuating voltage is applied between the fixed electrode 36 and its respective movable electrode 20, electrostatic attraction, working in a capacitive manner through the transparent dielectric 32, draws the movable electrode out across the front surface of transparent dielectric 32, as is described in considerable detail in my above cited co-pending applications. If digital control of electrode movement is desired then, either the edges of movable electrodes 20 or a fixed electrode 36, are not only tapered, but are also formed with serrations or steps to provide precise incremental advances in response to applied voltage changes. Such a stepped and tapered "Christmastree" shaped fixed control electrode is also described therein. Fixed electrodes 36 are necessarily transparent in order to permit the selected appearance of color screen 24 to be transmitted or reflected to viewer 12.

Depending upon the intended use of the display, a higher or lesser degree of transparency for fixed electrode layer 22 will be desirable or essential. Where a good appearance in the reflective mode is important, for example for outdoor applications, then control electrode layer 22 should have the best possible light transmissivity. The particular light transmissivity may also depend upon the desired resolution of the display. In relatively simple instrument or road sign applications, high transmissivity will not be critical. However, for the display of continuously changing complex images, such as color video images on television or computer screens, also intended for outdoor use, then high definition will be of great importance, making a very high light transmissivity, for control electrode layers 22, to be desirable. As also explained in my co-pending applications, and as will be apparent therefrom, reducing the thickness of the control electrode layer 22 will increase its light transmissivity but will reduce the conductivity of the electrodes therein. A preferred material for control electrode layer 22 is indium tin oxide which can be formed, in an approximately 300 Angstrom film, with a light transmissivity of about 95 percent combined with a film resistivity of only about 50 ohms per square. It will be apparent that control electrode layer 22 is secured to, or otherwise formed in intimate electrical contact with matrix layer 18 so that fixed electrodes 36 have a good capacitive relationship with transparent dielectric 32.

Figure 4:
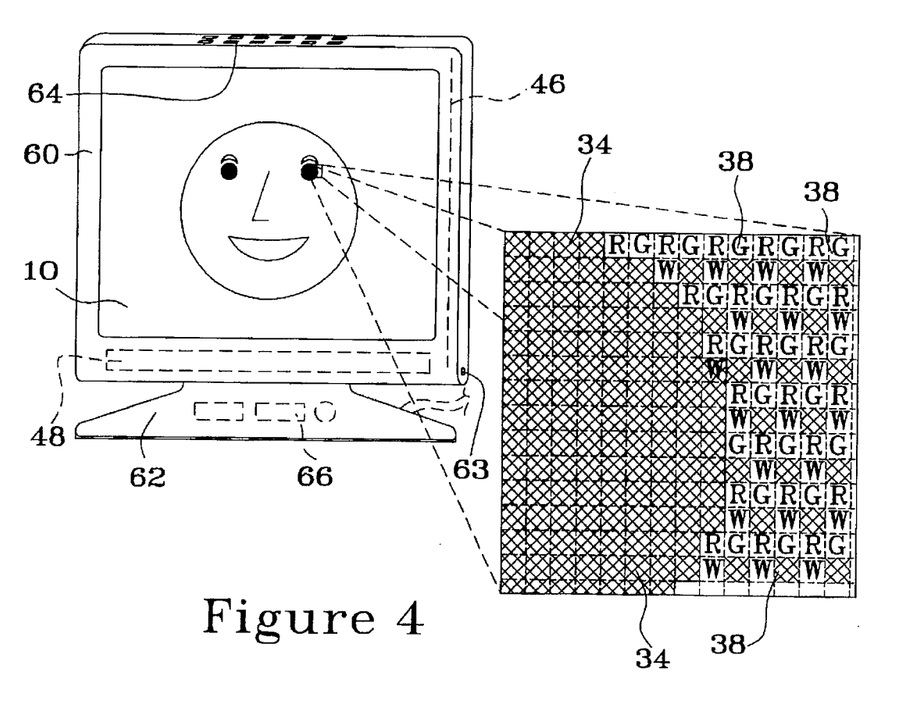
FIG. 4 is a perspective view of a display device incorporating a video display such as that described and shown with reference to FIGS. 1–3.

Drive circuitry for the movable electrodes 20 comprises vertical connectors 42 contacting each fixed electrodes 36 in columns labeled A,B,C,D and horizontal connectors 44 extending transversely of the rows 1,2,3,4,5 of movable electrodes 20, providing a half-select drive system. Connectors 44 terminate at terminator board 46 extending vertically along one side of the video display, which terminator board 46 can incorporate signal synchronization and gating circuitry if desired. Terminator board 46 leads or plugs to main video board 48, which, as indicated in FIG. 4, can be incorporated in a housing, for example, immediately beneath the video display 10. The balance of the video drive circuitry can be included on main video board 48, along with a processor, RAM and other electronic functionalities, if desired.

A satisfactory half-select drive system can be provided with only one transistor per row of movable electrodes 20 and one per column of fixed electrodes 36, which is substantially more economical than an active matrix display which requires a transistor for every pixel. A dumping capacitor and diode can be used for each pixel to avoid cross talk.

The drive circuitry also includes appropriate diode decoding circuits for row and column electrical drive and selective operation in rapidly changing desired groups and patterns of movable electrodes 20, to generate real-time moving video images, for example, in accordance with U.S. Pat. No. 4,336,536 to Kalt and Babcock.

Movable electrodes 20 can be secured to transparent dielectric 32 by lines of conductive adhesive (not shown).

Where, for example in smaller displays, movable electrodes 20, transparent dielectric 32 and the control electrode layer 22 are formed of thin film-like materials, then it may be desirable to provide a more rigid, clear substrate layer 40 (FIG. 3) to serve as a support for these layers. Substrate layer 40 is preferably incorporated between control electrode layer 22 and color screen 24, but could conceivably be incorporated behind color screen 24, as seen by viewer 12. It will be apparent that any such substrate layer 40 should be as transparent as practicable.

Figure 3:
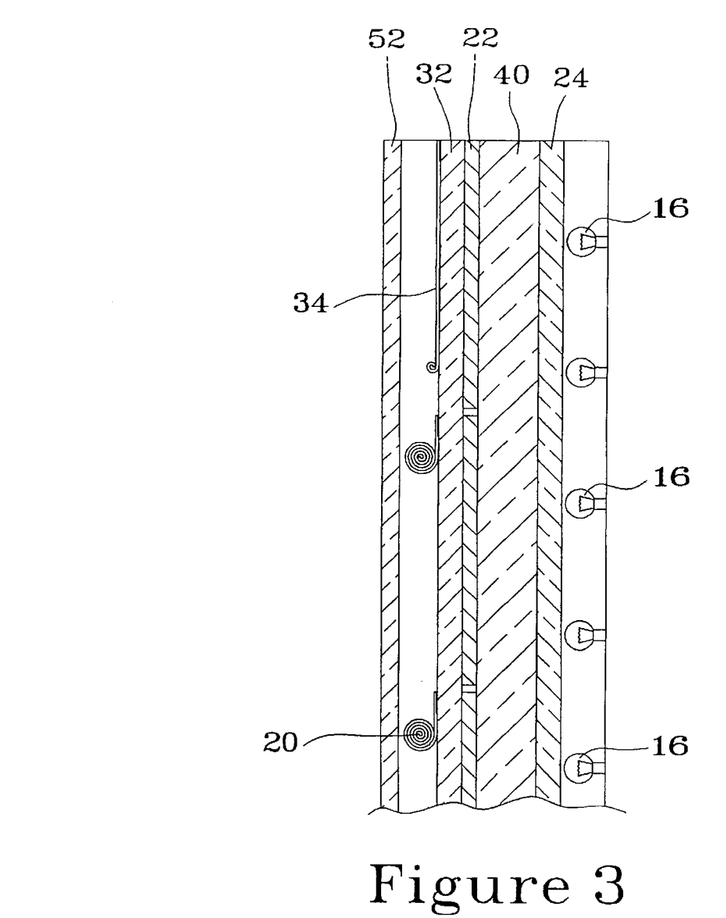
FIG. 3 is a partial sectional view of the video display of FIG. 1 (with the transparent cover in place)

Preferably, dielectric 32 fixed electrodes 36 and substrate 40 have light transmissivities of at least 98% or even 99% or higher.

Color screen 24 has a visual appearance which is selectively presented to the viewer 12 by actuation of movable electrodes 20 and this appearance is either transmissively, or reflectively generated, or both, depending upon the relative strengths of illumination provided by front lighting 14 and back lighting 16. Thus, in bright daylight or sunlight, however strong back lighting 16 may be, it is probable that a reflective image will prevail. When front lighting 14 is low or dim, for example in cloud, or at night, or in a darkened room, then a transmitted image, provided by modulation of light from back lighting 16, will prevail.

Color screen 24 could be monochrome having an appearance providing good contrast with the back surface appearance (black) of movable electrodes 20, for example white, yellow or orange, but more interesting effects are provided by mosaicking color screen 24 with a plurality of, preferably primary, colors, so that the possibility of presenting full color images to viewer 12 is attained.

Figure 2:
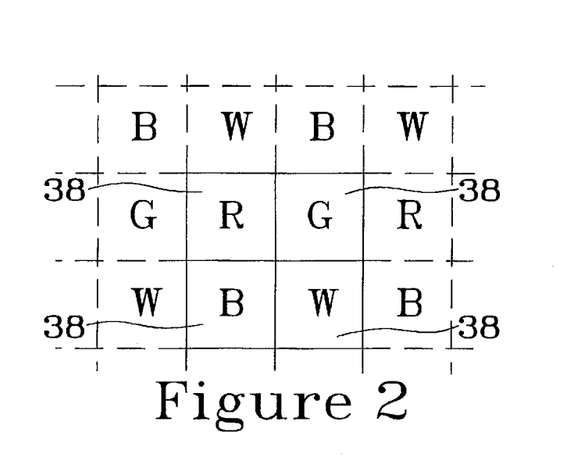
FIG. 2 is an enlarged view of a portion of a color screen employed in the video display of FIG. 1.

To this end, color screen 24 can be divided up, or segmented, into groups of small cells such as cells 38 shown in FIG. 2, in which groups adjacent cells have different visual appearances. Preferably each cell 38 corresponds in size and shape, and registers optically, with the aperture presented by retraction of a single movable electrode 24, for maximum selectivity of appearance. Alternative arrangements are possible, for example, a single cell 38 with a rectangular form, as shown, might register with a pair of triangular electrodes 20, unfurling in tandem from retracted positions aligned with a diagonal of such a square cell 38.

As shown in FIG. 2, a rectangular grid of four differently colored cells, individually colored red, green, blue, or other appropriate primary set, with white (e.g. cyan, magenta and yellow), can preferably be used for color screen 24. The primaries colors used, preferably red, green, and blue are chosen to maximize the gamut of colors obtainable by additive mixing of the primaries, subject to the color capabilities of the material of color screen 24 and limitations represented by dyes and pigments.

Noting that the size of the movable electrodes 20 is selected according to the intended viewing distance to be sufficiently small that individual electrodes are barely discernible, or detectable by the naked eye, preferred embodiments the color screen 24 are also such that, at the intended viewing distance its cellular or mosaic structure is not apparent, but merges to a continuous image so that light received from adjacent cells, or groups of cells is additively mixed by the viewer's eye.

A visually balanced pattern of squares 38 in groups of four adjacent cells, of balanced intensities and hues, can give the display an overall appearance to a viewer at the intended viewing distance, with all electrodes 24 retracted, which will be white or a light grey color.

The appearance of selected image areas, of video screen 10, can be varied with regard to hues, lightness and intensities, by selecting groups of movable electrodes 20 to display appropriate color combinations or combinations with black or white, or graduated areas of black, in relation to corresponding color screen cells 38, to present any desired colored appearance within the gamut of the display. For example, a yellow area can be depicted by displaying a group of red and green cells 38 with blue-registering movable electrodes 20 being extended to cover, or partially occlude, blue cells 38. The chroma or hue intensity of the yellow image area can be varied by selectively occluding or leaving open white cells 38.

Color screen 24 can be manufactured of any suitable materials and by any suitable method that will provide the properties described herein that contribute to the desired visual appearance of the inventive video display. In preferred embodiments, color screen 24 is formed of plastic film materials in which plastic films, suitable dyes or pigments are dispersed through the film in order to provide an appropriate light-filtering effect for transmissive displays and also to present an adequately colored reflective film for reflective displays. If desired a diffusing screen can be placed between back lighting 16 and color screen 24 in order to enhance the reflective display. In one embodiment, color screen 24 is formed with three layers selected to provide a desired group of three primary colors, for example red, green and blue, one to each layer. The layers can be appropriately patterned to display the individual primaries as shown in FIG. 2. One way of manufacturing such a multilayered color screen 24 is by laser ablation of individual, thin, colored polyester films, preferably MYLAR (trademark) film. An alternative manufacturing method involves the laying down of appropriately colored squares, side by side on a thin-film clear transparent substrate which transparent substrate can, with some pigmentation, if desired, provide white cells 38 in spaces left open by the colored squares.

A further alternative for the manufacture of color screen 24 is by conventional photographic production of color separation films. Individual separations in red, green, and blue are preferred to the more conventional subtractive primaries, cyan, magenta, and yellow, because, with their side-by-side dispositions, color cells 38 mix additively, in a manner analogous to pointillism.

In another embodiment, a desired red, green and blue pattern of cells 38 can be produced in conventional CMY separations using, for example, proofing film, such as acetate film, by simply designating the red, green and blue areas with appropriate CMY blends, for example red might be 100M 100Y, green 100Y 100C and blue might be 100C 100M, or preferably, 100C 80M. A composite color screen 24 can thus be fabricated from individual cyan, magenta and yellow layers, yet have red, green and blue cells. If desired, white could be provided in a further white-pigmented or dyed transparent film in areas registering with clear cells in the CMY separations.

A drawback of using dyed transparent films to form color screen 24, is that dyed films have a rather modest reflectivity leading to a less than desirable image intensity in bright light. Furthermore, depending upon the surface structure of the film, and the distribution of dye at the surface of reflection, surface phenomena may result in variations in the spectral composition of the reflected light beam, so that the spectral distribution of the reflected beam is either similar to the transmitted hue or complementary thereto, leading to a quite different visual effect from that obtained with transmitted light. This uncertainty is a further problem with dyed film materials.

Accordingly, to avoid these problems, preferred color screen materials, are pigmented film materials in which pigment particles are dispersed, preferably uniformly, through a transparent film with a density sufficient to enhance reflection yet low enough to permit adequate light transmission to maintain a clearly visible back-lighted image in low ambient light conditions. Since image definition is provided by pixel boundaries, sharp definition within a cell 38 is not needed. Therefore some diffusion within the film, by repeated reflection off the pigment particles, is not a problem. Alternatively, films can be imprinted with patterns in transparent inks that have desirable characteristics of both transmittance and reflectance.

Figure 5:
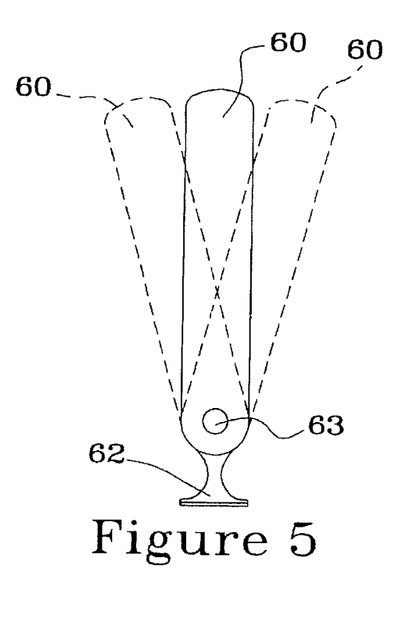
FIG. 5 is a side elevation of the video display of FIG. 4.

FIGS. 4 and 5 show a conceptualization of a thin, flat-screen video display monitor embodying a video display according to this invention, from which some of the advantages provided by the invention are clear. Referring to FIGS. 4 and 5, the video display 10 is shown incorporated in a slim display housing 60 which, from the front (FIG. 4) has an appearance akin to that of a conventional video monitor but, from the side, a remarkably slim, generally rectangular profile is apparent.

The housing 60 is carried by a swivel base 62, on which housing 60 is supported by a universal joint 63 permitting limited freedom of movement, or swiveling in two dimensions. Because of the light weight of the display unit comprised by video display 10, housing 60 and associated circuitry, can be positioned directly under the video display or screen 10, so that the video display 10 can be easily tilted through a wide range of angular adjustments to suit the user or viewer. Controls 64 are shown conveniently located horizontally across a top plinth of housing 60 where their actuation, by light downward pressure in a direction toward the point of swivelling of base 62, should not disturb the orientation of the video display 10.

Mechanical stability is enhanced by installing heavier components, such as a power supply 66, (which could comprise batteries) in the swivel base 62. Because of the very low power needed for electrostatic actuation of movable elements 20, power supply 66 can be relatively low output and light in weight. As shown in FIG. 4, terminator board 46 is accommodated in the right-hand side of housing 60 and main video board 48 is mounted within housing 60 beneath video display 10 to create a self-contained, lightweight, low-power video unit requiring only a power supply 66 and an input signal to be operative.

If desired, a video input can also be connected through swivel base 62 and wired internally to the main video board 48, through leaving housing 60 free of external connections.

It will be appreciated by those skilled in the art, that this design can be widely adapted to take advantage of the unique benefits provided by this invention. In particular, the design can readily be incorporated in a portable, notebook or notepad computer FIG. 4 also includes a blown-up grid portion 68 showing a schematic enlargement, not to scale, of how an eye 70 of a cartoon-style "sunshine" face 72 might be pixellated. On the lefthand side of blown-up grid portion 68, a continuous zone of movable electrodes 20 is fully extended, closed, to present a continuous dark or black area of adjacent outer surfaces 34 to depict a portion of eye 70. On the righthand side, three quarters of the movable electrodes 20 are open, retracted to reveal and admit light from colored cells 38, having the colors, red, green or white, as indicated by the initial letters "R", "G", "B" and "W", and depict a shaded yellow facial area adjacent to eye 72. It will be understood that FIG. 4 shows a simplified image for ease of understanding and that the full complexity of a typical television or cinematic video image can be displayed with an acuity and resolution meeting or exceeding conventional television standards, by appropriate miniaturization of the pixels of the inventive displays described herein.

The general uses, operation and advantages of the preferred embodiments of video displays which this invention provides will be clear from the foregoing description. Thus, in a modestly illuminated office or home environment, light output from back lighting 16, traveling on a transmissive path such as 26, is filtered into a mosaic of colored cells by color screen 24, which permits passage of selected intensities of desired spectral wavelengths, then modulated by impact with a selected pattern of activated movable electrodes 20, to deliver the desired image to viewer 12 in transmitted mode.

In a similar manner, bright illumination (front lighting 14,) traveling on paths such as 28 is selectively reflected off color screen 24, then modulated by the pattern of movable electrodes 20 to deliver the desired image to viewer 12 in reflected mode, providing a clear image even when ambient light overwhelms back lighting 16. This brightly lit reflective image, because daylight is substantially non-directional, has excellent visibility over a wide angle of view, a definite advantage over conventional portable computer displays which have a very narrow angle of view.

Conventional full-color dynamic video displays rely on phenomena such as the transmission of light through frames of moving film or on selective energization of differently colored pixels to transmit, or emit, the desired image, or on the use of light-emitting diodes. Proposals also exist for full-color liquid crystal displays. In contrast thereto, the present invention employs a passive, pixellated colored matrix, color screen 24 to modulate white light rays, in combination with a dynamic masking or shuttering system for molding the modulated light rays received from the color screen 24 into a desired image for display to a viewer 12. In other words, matrix layer 18 of movable electrodes 20 together with control electrodes 22 function as a shuttering system having individually controllable shutters cooperating with discrete colored screen cells 38, of varied visual appearance to provide individually addressable pixels having a range of visual appearances which can be grouped for composition into an infinite variety of images.

While the disclosed light-modulating capacitor arrays are a particularly advantageous shuttering system, other shuttering systems providing pixel size, individually addressable light gates, may be used, for example, liquid crystal devices.

By placing the shuttering system between the viewer and the colored pixellated screen, and by employing a reflective and transmissive colored screen, it becomes possible to illuminate the image both from the front, by reflected light and from behind, by transmitted light.

A particular advantage of the invention is that the two major elements of the video display, namely the dynamic shuttering system comprised by matrix layer 18 of movable electrodes 20, and the color screen 24, can be economically manufactured with known techniques, or with the techniques disclosed in our pending patent applications. By structural separation of the functions of shuttering and coloring needed for a color video display, both systems are simplified. Matrix 18, being monochrome, preferably a uniform black, all its movable electrodes 20 can have the same structure. Matrix 18 thus has a simpler construction than equivalent matrices in the full-color displays described in the parent applications recited above, which employ colored movable electrode elements of various hues, while the video display 10 has the advantages of being a full-color display employing light-modulating capacitor pixels.

Matrix 18, controlled by control electrode layer 22 and driven by drive circuitry operative from a video input signal, as described herein, comprises a dynamic image-composition mask which selectively filter and masks light received from color screen 24, to create any desired, colored video image. The dynamic image composition mask can employ an array of individually controllable openable shutters registering optically with cells in the color screen so that an opened shutter displays a single color screen cell.

Thus, all the movable electrodes 20 in matrix 18 can be formed from a single sheet of metalized plastic. Similarly, color screen 24, provides a colored pixellated matrix which can interact with white light to provide an array of minute, color-differentiated light beams composable into an image, but has no active image composition functions: color screen 24 is passive, simply constructed with no moving or activatable parts and can readily be produced economically by mass production methods, as suggested above, including for example press or proofing press production.

Other structures of color screen 24, meeting the general requirements of the present invention, will be known to those skilled in the art, or will become available as new technologies emerge.

Careful and precise registration and alignment of movable electrodes 20 with color cells 38 of color screen 24, enables matrix 18 and color screen 24 to interact at the pixel level, so that the appearance characteristics, including hue of a pixel unit defined for example by a group of four cells, red, green, blue and white can be varied through a wide gamut by selective actuation of a corresponding group of four similar, movable electrodes 20 which accordingly act as cooperative masking or shuttering elements. For accurate registration, very close spacing between matrix 18 and color screen 24 is preferred, to which end substrate 40 can, if desired, and if needed, be positioned behind color screen 24 (from the viewer 12's perspective).

Video displays constructed with electrostatically driven pixels as described can be incorporated in a variety of display devices and equipment bringing advantages of good viewability in lighting-independent conditions, a wide angle of view and economy of manufacture from low-cost materials without high-temperature or exotic manufacturing steps. They can be miniaturized and incorporated not only in conventional video-displaying equipment such as computer and television equipment but also in novel, compact, low-power, flat-screen displays that can, for example be small enough to be handheld and carried in a pocket. Larger displays, incorporating relatively large pixel structure, have application in arenas, or sports stadia, and theaters as well as advertising billboards, road signs and the like. Moderate power-consuming intensities of back-lighting 16 will provide a clearly illuminated night time display, while daylight provides a clear, high intensity reflective display. Response times are excellent with large movable electrodes of the order of one inch square being capable of opening and closing at an equivalent of 30 frames per second, while small movable electrodes will operate with much faster response times. Also on a smaller scale, the principles of the invention described herein can be readily adapted to provide electronically driven instrumentation displays for vehicles, including aircraft, that are readily visible in both dim light, or darkness, and the brightest of daylight or sunlight.

Versatility is provided by the ability of the inventive displays to tolerate a wide range of operating conditions, with no theoretical objections to operating temperatures of $-100°$ F., or below, down to near cryogenic and a comfortable upper limit, for polyester film movable elements of the order of $140°$ F. Higher operating temperatures can be tolerated by more expensive film materials such as polyimides. The very low heat output of the inventive displays is another advantage when considering higher temperature applications. Also, as compared with other mechanically movable element constructions, polymer film elements have advantages of very low inertia, fast response and low susceptibility to fatigue crystallization with repeated use, which coiled metallic elements may be expected to suffer. Lateral curling of an advancing element 20 can effectively be prevented by means such as those described in my parent patent No. 5,231,559 and the elements can be prestressed at relatively modest temperatures in economical production methods. Although the term "video" has been used herein to connote or suggest the use of the inventive display system for dynamic display of moving images in the eminently important fields of television, computing, games and the like, it will be understood that the inventive display systems and methods disclosed herein are also adaptable and useful for statically displayed, though changeable applications, such as road warning signs, train or airplane arrival and departure information, and so on.

The visual lighting independent nature of displays according or their dual lightability characteristics can perhaps be helpfully appreciated by considering a gas station sign, many of which have internal fluorescent lighting for night time viewing and are clearly viewed reflectively, by daylight, when ambient lighting is high.

While illustrative embodiments of the invention have been described above, it is, of course, understood that various modifications will be apparent to those of ordinary skill in the art. Such modifications are within the spirit and scope of the invention, which is limited and defined only by the appended claims.

I claim:

1. A flat panel video display viewable by either transmitted or reflected light, depending upon an ambient illumination level, having a layered matrix structure and employing light-modulating capacitor pixels, said layered matrix structure comprising:

i) a movable electrode shutter layer having a composite array of movable electrodes disposed toward a viewer, said movable electrodes having an open, retracted position providing a clear light path past said movable electrode and a second, extended position in which said light path is occluded by said movable electrode;

ii) a dielectric layer having a transparent sheet-like dielectric member in capacitive contact with said movable electrodes in said extended position of said movable electrodes;

iii) a control electrode layer having an array of translucent control electrodes contacting and in electrostatic engagement with a second surface of said dielectric member to control said movable electrodes, said dielectric member and said control electrodes providing an array of light-modulating capacitors;

iv) drive circuitry to apply drive voltages selectively between said fixed electrodes and said movable electrodes to effect movement of selected movable electrodes; and v) a color screen layer disposed adjacent to said shutter layer and behind said shutter layer with respect to said viewer said color screen layer being composed of colored screen segments and being capable of displaying a similar colorant-modulated appearance by either transmitted or reflected light depending upon the ambient illumination level; whereby movement of an individual movable electrode into a retracted, open position displays a segment of such colored screens to a viewer, multiple said movable electrodes can be actuated to display a composed image area of said colored screen segments to said viewer and whereby said composed image area is viewable by reflected light or transmitted light depending on the illumination level.

2. A flat panel video display according to claim 1, wherein each said movable electrode comprises a plastic lamina prestressed into a coiled configuration.

3. A flat panel video display according to claim 1, wherein each said movable electrode has a conductive electrode surface to contact said dielectric member.

4. A flat panel multicolor video display according to claim 3 wherein adjacent colored segments have different primary color appearances and are aligned with said movable electrodes whereby adjacent electrodes can be operated to present said different primary color appearances of said colored segments in a selective manner.

5. A flat panel video display according to claim 4 wherein said cells are arranged in adjacent groups of four cells having the appearance of three primary colors and white.

6. A flat panel video display according to claim 4 wherein said colored screen is composed of multiple layers of red, green or blue colorant-loaded transparent material arranged in patterns to give said individual cells desired visual characteristics.

7. A flat panel video display according to claim 4 wherein said cells and said movable electrodes have corresponding and similar geometrical sizes and shapes and said colored cells are arranged in repeating groups of four, each said group of four cells comprising a red cell, a green cell, a blue cell and a white cell.

8. A flat panel video display according to claim 1 wherein said movable electrodes are electrically connected in rows and said fixed control electrodes are electrically connected in columns and wherein said drive circuitry includes row-and-column diode decoding means to provide selective actuation of groups of individual movable electrodes.

9. A flat panel multi-color video display according to claim 1 comprising polychromatic colored screen segments wherein said movable electrodes present a black appearance to said viewer in said extended position and are configured and disposed for said composite array of movable electrodes to provide the appearance of a substantially continuous black screen at an intended viewing distance when said electrodes are all in said extended positions.

10. A multicolor video display for viewing by reflected light, having a layered structure and employing light-modulating capacitor pixels, said layered structure comprising:

i) a movable electrode shutter layer having a composite array of movable electrodes disposed toward a viewer, said movable electrodes having an open, retracted position defining a pixel aperture and providing a clear light path past said movable electrode and a second, extended position in which said light path is occluded by said movable electrode;

ii) a dielectric layer having a transparent dielectric member in capacitive contact with said movable electrodes in said extended position of said movable electrodes;

iii) a control electrode layer having an array of translucent control electrodes contacting and in electrostatic engagement with a second surface of said dielectric member to control said movable electrodes, said movable electrodes, said dielectric member and said control electrodes providing an array of light-modulating capacitors;

iv) a reflective, static color screen layer disposed behind the shutter layer with respect to the viewer, said color screen layer being fixedly composed of colored segments, each said colored segment corresponding with and being aligned with said one of said pixel apertures to intercept said pixel aperture light path, adjacent said segments having different colors to provide multicolor display capabilities;

whereby said color screen layer can be selectively masked by actuation of said movable electrode shutter layer to permit reflection to the viewer of an image composed of selected color screen segments.

11. A multicolor video display according to claim 10 wherein said different colors comprise three primary colors and white.

12. A multicolor video display according to claim 10 wherein said color screen segments are light-transmissive and comprising a source of illumination behind said color screen with respect to a viewer to provide a display viewable by both reflected and transmitted light.

13. A reflective, thin-panel, multicolor video display having a layered structure and employing light-modulating capacitive pixels, said layered structure comprising:

I) a movable electrode shutter layer formed from a continuous film of flexible material and having a composite array of movable electrodes, said movable electrodes each having:

a) a pigmentable reflective surface disposable toward the viewer;

b) an open, retracted position providing a clear light path past the movable electrode; and c) a second, extended position in which said light path is occluded by the movable electrode and the movable electrode's reflective surface is disposed toward the viewer;

ii) a dielectric layer formed from a continuous film of dielectric material and comprising a transparent, sheet-like dielectric member in capacitive contact with the movable electrodes in said extended position of each said movable electrode;

iii) a light-transmissive control electrode layer disposed in electrostatic engagement with a second surface of said dielectric member to control said movable electrodes;

wherein said movable electrodes, said dielectric member and said control electrodes provide an array of light-modulating capacitors;

iv) drive circuitry to apply drive voltages selectively between said fixed electrodes and said movable electrodes to effect movement of selected movable electrodes; and v) a reflective color screen layer disposed adjacent to said shutter layer and behind said shutter layer with respect to said viewer, said color screen layer being composed of a mosaic of reflective colored screen segments individually configured and dimensioned to correspond with said capacitive pixels, adjacent said segments having different colors to provide multi-color display capabilities;

whereby multicolored images can be selectively displayed by electronic manipulation of said movable electrodes.

14. A video display according to claim 13 wherein said continuous film of dielectric material comprises a polymer film having opposed surfaces and being metallized on one surface and presenting a black appearance at the other surface, whereby, when the electrode is extended, the metallized surface is in capacitive contact with the dielectric layer and said other surface presents a black appearance to the viewer; wherein said colored screen segments are arranged in adjacent groups of four segments per group, having the appearance of three primary colors and white.

15. A video display according to claim 14 wherein said color screen segments are light-transmissive and are colored to have a similar hue by either transmitted or reflected light, whereby said display is viewable by reflected ambient light or transmitted applied light, depending upon ambient illumination levels.

16. A video display according to claim 15 wherein said colored screen is formed from continuous film material.

17. A flat-panel, multi-color, video display manufactured by a method according to claim 16.

18. A method of manufacturing a reflective, thin-panel, multicolor video display having a layered structure and employing light-modulating capacitive pixels, comprising:

I) forming a movable electrode shutter layer from a continuous film of flexible material to have a composite array of movable electrodes, said movable electrodes each having:

a) a pigmentable reflective surface disposable toward the viewer;

b) an open, retracted position providing a clear light path past the movable electrode; and c) a second, extended position in which said light path is occluded by the movable electrode and the movable electrode's reflective surface is disposed toward the viewer;

ii) forming a dielectric layer from a continuous film of dielectric material to comprise a transparent, sheet-like dielectric member in capacitive contact with the movable electrodes in said extended position of each said movable electrode;

iii) forming a light-transmissive control electrode layer disposed in electrostatic engagement with a second surface of said dielectric member to control said movable electrodes;

whereby said movable electrodes, said dielectric member and said control electrodes provide an array of light-modulating capacitors;

iv) providing drive circuitry to apply drive voltages selectively between said fixed electrodes and said movable electrodes to effect movement of selected movable electrodes; and v) providing a reflective color screen layer disposed adjacent to said shutter layer and behind said shutter layer with respect to said viewer, said color screen layer being composed of a mosaic of reflective colored screen segments individually configured and dimensioned to correspond with said capacitive pixels, adjacent said segments having different colors to provide multi-color display capabilities;

whereby multicolored images can be selectively displayed by electronic manipulation of said movable electrodes.

* * * * *